United States Patent [19]

Pillsbury

[11] Patent Number: 4,961,389
[45] Date of Patent: Oct. 9, 1990

[54] SLAG PROCESSING SYSTEM FOR DIRECT COAL-FIRED GAS TURBINES

[75] Inventor: Paul W. Pillsbury, Winter Springs, Fla.

[73] Assignee: Westinghouse Electric Corp., Pittsburgh, Pa.

[21] Appl. No.: 410,400

[22] Filed: Sep. 21, 1989

Related U.S. Application Data

[63] Continuation-in-part of Ser. No. 404,396, Sep. 8, 1989.

[51] Int. Cl.$^5$ .............................................. F23B 7/00
[52] U.S. Cl. .................................. 110/233; 60/39.464; 110/165 A; 110/171; 110/341; 110/216
[58] Field of Search ................... 110/233, 264, 165 R, 110/165 A, 171, 341, 347, 216; 60/39.464, 39.02

[56] References Cited

U.S. PATENT DOCUMENTS

| | | | |
|---|---|---|---|
| 4,472,171 | 9/1984 | Broderick | 48/62 |
| 4,494,971 | 1/1985 | Monteyne et al. | 65/19 |
| 4,550,563 | 11/1985 | Marchand | 60/39.464 |
| 4,722,483 | 2/1988 | Saville et al. | 241/23 |
| 4,758,260 | 7/1988 | Geropp et al. | 65/19 |
| 4,768,446 | 9/1988 | Wilkes et al. | 110/233 X |
| 4,800,825 | 1/1989 | Kuenzly | 110/345 |

OTHER PUBLICATIONS

Diehl, et al., "Development of an Advanced Coal-Fired Gas Turbine Combustor", AVCO Research Laboratory, HT. Engine Contractors' Conference, (Jun. 14, 1988).
Loftus et al., "The Use of 3-D Numerical Modelling in the Design of a Gas Turbine Coal Combustor", AVCO Research Laboratory, presented at the Winter Annual Meeting of the American Society of Mechanical Engineers (Dec. 1988).
Chatwani, et al., "Fundamental Modelling of Pulverized Coal and Coal-Winter Slurry Combustion in a Gas Turbine Combustor", *Proceedings, the Third Chemical Congress of North America*, Toronto (Jun. 1988).
Bannister, et al., *Westinghouse Advanced Coal-Fueled Gas Turbine Program* (undated).
Diehl, et al., "A Direct Coal-Fired 80 MW Utility Combustion Turbine-Status Report", *A.S.M.E. Gas Turbine Meeting*, Toronto (Jun. 1989).
Smith, ed., "Large 60 Hz Model V84 Gas Turbine Launched by KWU", *Modern Power Systems*, pp. 39-47 (Sep. 1983).
Babcock and Wilcox, *Steam Its Generation and Use*, 38th Ed., (1975), pp. 10-8 and 15-10.
B. Skrotzki and W. Bopat, *Power Station Engineering*, McGraw Hill (1960), p. 145.

Primary Examiner—Edward G. Favors

[57] ABSTRACT

Direct coal-fired gas turbine systems and methods for their operation are provided by this invention. The gas turbine system includes a primary zone for burning coal in the presence of compressed air to produce hot combustion gases and debris, such as molten slag. The turbine system further includes a secondary combustion zone for the lean combustion of the hot combustion gases. The operation of the system is improved by the addition of a cyclone separator for removing debris from the hot combustion gases. The cyclone separator is disposed between the primary and secondary combustion zones and is in pressurized communication with these zones. In a novel aspect of the invention, the cyclone separator includes an integrally disposed impact separator for at least separating a portion of the molten slag from the hot combustion gases.

17 Claims, 2 Drawing Sheets

SLAG PROCESSING SYSTEM FOR DIRECT COAL-FIRED GAS TURBINES

CROSS REFERENCE TO RELATED APPLICATIONS

This application is a continuation-in-part application of my earlier application entitled "SLAG PROCESSING SYSTEM FOR DIRECT COAL-FIRED GAS TURBINES" Ser. No. 07/404,396, filed on Sept. 8, 1989.

FIELD OF THE INVENTION

This invention relates to techniques for removing waste from direct coal-fired gas turbine systems, and more particularly, to specific processing techniques for removing slag from such turbines during their operation.

BACKGROUND OF THE INVENTION

Recently, much effort has been directed to developing advanced direct coal-fired gas turbine systems for electric utility applications. One approach is based on a multi-stage, slagging combustor with specified emissions control. Instead of requiring a low-ash, highly beneficiated coal, the slagging combustor concept allows the use of a raw or moderately cleaned, utility grade coal of higher ash content, thus maintaining a lower fuel cost. The economics of such a design are considered more favorable than conventional pulverized coal steam plants.

The success of direct coal-fired combustion systems relies heavily on the effectiveness of the slagging combustor itself. The slagging combustor is a modular unit with three principal stages. The first stage is the primary combustion zone or compartment. Coal and preheated compressed air, enter the primary zone coaxially through a plurality of injection nozzles which are equally spaced around the combustion chamber. This coaxial injection promotes intense air and coal mixing and rapid particle heat-up and devolatilization, which minimize carbon burn-out time.

The incoming coal-air jets converge at the combustor center line and form one vertical jet which impacts the combustor dome. This forms a toroidal vortex which provides the mechanisms for flame stabilization and centrifugal separation of larger ash and slag particles. The separated ash and slag form a stable flowing layer on the combustor walls. The vertical geometry of this stage allows gravity to assist in the removal of the molten slag. Fuel-rich conditions in the primary combustion zone inhibit $NO_x$ formation from fuel-bound nitrogen. They also provide the necessary reducing conditions for removal and capture of sulfur. The sulfur sorbent, limestone, dolomite, hematite or magnetite is counter-flow injected into the downstream end of the primary zone. The first stage is designed for a coal particle residence time of about 100 ms (for 75 micron sized particles).

The second stage of the direct coal-fired combustor is an efficient impact separator which is closely coupled to the first stage. The impact separator removes particulates carried over with the gas from the primary zone, whether they are sorbent or fine particles of ash.

To meet government regulations regarding particulate standards, a slagging cyclone separator has been suggested to be combined with the impact separator. See Diehl, et al. "Development of an Advanced Coal-Fired Gas Turbine Combustor" AVCO Research Laboratory, Heat. Engine Contractors' Conference, June 14, 1988; Loftus, et al. "The Use of 3-D Numerical Modelling in the Design of a Gas Turbine Coal Combustor", AVCO Research Laboratory, presented at the Winter Annual Meeting of the American Society of Mechanical Engineers (Dec., 1988), which are hereby incorporated by reference. This combination of slag and ash removal promotes cleaner inlet gases for the third stage, also referred to as the secondary combustion zone. However, significant heat loss occurs, since the gases are channeled over a relatively large expanse of cooler surfaces of an additional pressure vessel, containing the cyclone separator, located between the exit of the impact separator and the entrance of the secondary combustion zone. Although the additional pressure vessel is water-cooled and refractory-lined for receiving the high temperature gases leaving the impact separator, it causes a substantial additional heat loss from the cycle. Moreover, the combination of impact and cyclone separators necessitates the use of a larger pressure vessel environment, with attendant expense and maintenance.

For slagging to occur, temperatures throughout the combustion chamber, and particularly at the walls, must not fall below about 2,600° F., 1427° C., depending upon the type of coal. These temperatures are achieved by employing a proper air to fuel ratio, by providing adequate design for refractory walls, and sufficient residence time for the reacting coal to air mixture.

In the third stage of the slagging combustor, complete combustion is accomplished and the combustion gases are tempered to meet turbine inlet requirements. This stage preferably consists of a single module with a pressure shell as is found in the first two stages. To prevent the possibility of refractory particles in the exhaust system passing to the turbine, this section has no refractory lining. Combustion and dilution air are introduced through two rows of injection tubes with approximately sixteen tubes per row circumferentially spaced.

While for the most part, the early designs of direct coal-fired gas turbine systems have showed much promise, there is a current need for a more effective method for removing slag particles and ash prior to forwarding gases into the secondary combustion zone. Since gas turbine systems often operate at high pressures customary for the industry, i.e., 10, 12, or 14 atmospheres, any deslagging procedure should minimize system high pressure working fluid losses. Such a system would also be required to move a high volume of slagging products out of the gas turbine within a relatively short time, with a minimum of heat loss for maintaining efficiency.

SUMMARY OF THE INVENTION

A direct coal-fired gas turbine system of the type having primary and secondary combustion zones for transforming coal and compressed air into a hot gas stream for generating electric power in combination with a gas turbine is provided. The system includes the improvement by which cyclone separation means are disposed between the primary and secondary combustion zones. The cyclone separation means is in pressurized communication with these zones and includes integrally disposed impact separation means for separating the molten slag and hot combustion gases, produced by the primary combustion zone.

Accordingly, a turbine system is disclosed for minimizing heat losses, which are known to exist with current slagging combustion gas turbine systems. By combining the function of impact and centrifugal separation in one pressure vessel, the heat losses are reduced. In addition, the design is more compact than current designs employing separate impact and cyclone separators, and is therefore less costly to install and maintain.

It is therefore an object of this invention to provide a coal-fired gas turbine system having a deslagging chamber capable of removing molten slag, coal-ash, dolomite, and other flying debris from the gas stream prior to contacting this stream with a turbine;

It is another object of this invention to provide a combination impact and cyclone separator, which minimizes pressure and heat losses, while simultaneously keeping maintenance cost low.

With these and other objects in view, it will become apparent to one skilled in the art as the description proceeds, that this invention resides in the novel combination, construction, arrangement of parts and methods substantially as hereinafter described and more particularly defined in the attached claims.

BRIEF DESCRIPTION OF THE FIGURES

The accompanying drawings illustrates a complete embodiment of the invention according to a preferred mode for the practical application of the principles thereof, and in which.

DESCRIPTION OF THE INVENTION

Figure 1:
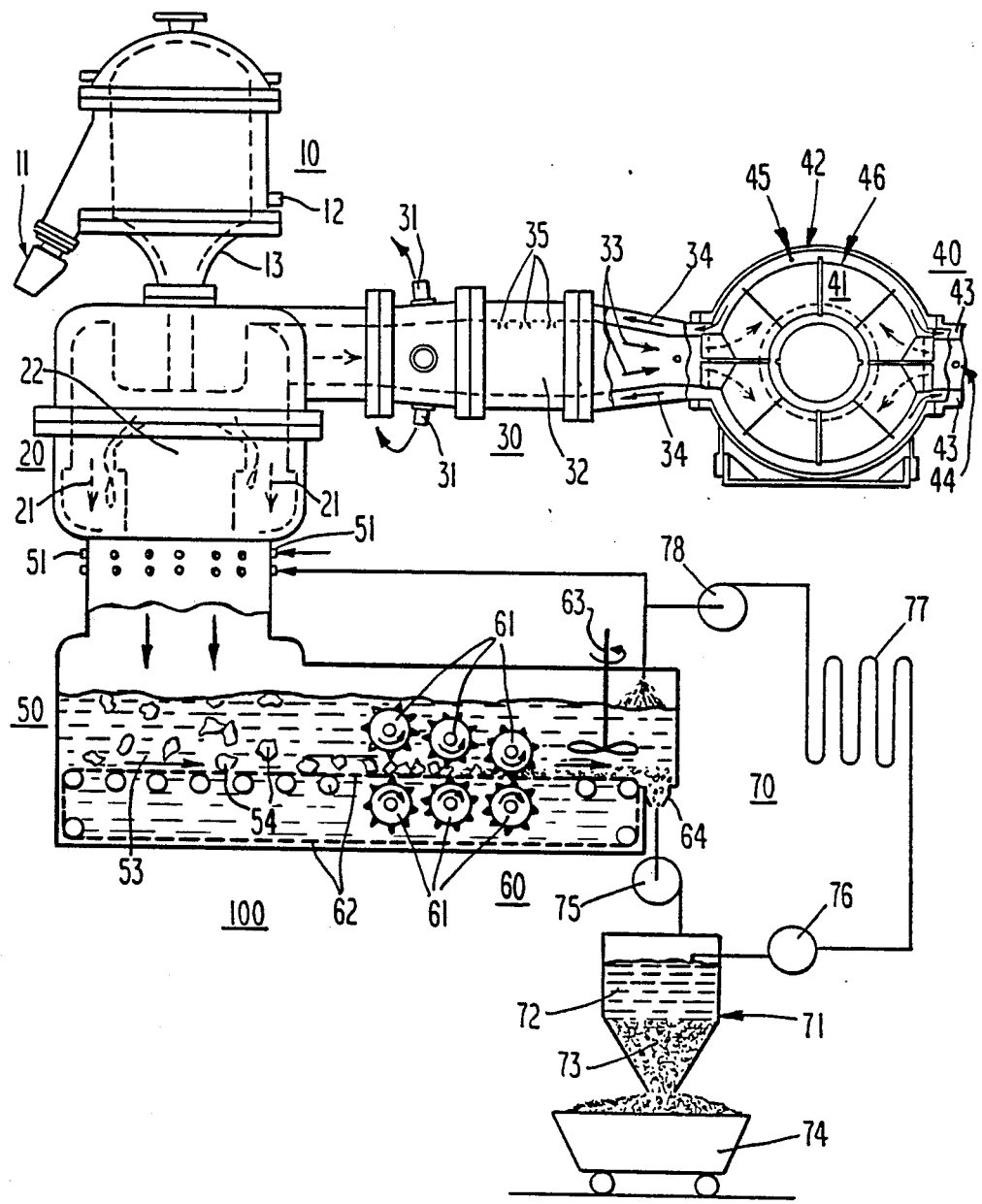
FIG. 1 is a diagrammatic view of a direct coal-fired gas turbine system including an impact slag separator, quenching and processing mechanisms for solidifying molten slag and forming a slurry therefrom, and a settling tank and recycling system for conserving water.

According to this invention, a direct, coal-fired gas turbine system of the type having a primary combustion zone for burning coal in the presence of compressed air to produce debris, such as molten slag, and hot combustion gases is provided. The turbine system includes a secondary combustion zone for the lean combustion of the hot combustion gases. The secondary combustion zone is coupled to a turbine for the generation of electric power. The turbine system of this invention includes the improvement in which cyclone separation means are provided for removing a portion of the debris from hot combustion gases. The cyclone separation means is disposed between the primary and secondary combustion zones and is in pressurized communication with these zones. The cyclone separation means further includes integrally disposed impact separation means for at least separating a portion of the molten slag from the hot combustion gases.

In a more detailed embodiment of this invention a direct coal-fired system is provided including a primary combustion zone for burning coal in the presence of compressed air to produce hot combustion gases and debris, including molten slag. The system further includes a secondary combustion zone for the lean combustion of the hot gases. Cyclone separation means are provided for substantially separating the debris from the hot combustion gases to produce clean hot gases. The cyclone separation means comprises a pressure vessel having an inner wall with a water-cooled refractory lining. The pressure vessel includes an impact separator disposed on the inner wall. The impact separator, in turn, comprises a deflector having a water-cooled refractory surface. The deflector is disposed for receiving at least the molten slag from the primary combustion zone and directing the molten slag onto the inner wall of the pressure vessel. This pressure vessel further comprises a vortex-finder exit pipe having an opening disposed in said pressure vessel below the impact separator. The vortex-finder exit pipe is disposed in the pressure vessel for receiving the clean hot gases.

This invention also pertains to a method of removing debris from hot combustion gases in a direct coal-fired gas turbine system of the type having primary and secondary combustion zones. The method includes providing cyclone separation means for removing a portion of the debris from the hot combustion gases. The cyclone separation means is disposed between the primary and secondary combustion zones and is in pressurized communication with these zones. The cyclone separation further includes an integrally disposed impact separator. The method further includes burning coal in the presence of pressurized air in the primary combustion zone to produce hot combustion gases and debris, such as molten slag. A portion of the debris and hot combustion gases are then contacted with the impact separator to separate a portion of the hot combustion gases from the debris. Next, at least the hot combustion gases are centrifugally directed along an inner wall of the cyclone separation means to further separate the debris from the hot combustion gases to produce clean hot gases. The clean hot gases are disposed into the secondary combustion zone and are combusted with additional air in a lean mixture. As used herein, the term "debris" refers to, for example, molten slag, coal ash, dolomite, etc., although molten slag is deemed to be the most prevalent constituent.

Referring now to FIG. 1, a preferred direct coal-fired gas turbine system 100 will now be described. The overall system 100 includes a primary combustion zone (rich) 10, impact slag separator region 20, final combustion zone (lean) 30, combustion turbine 40, quenching apparatus 50, slurry processing apparatus 60, and recirculation system 70.

The primary combustion zone 10 includes injector 11 for primary combustion of air and coal. It also may include sorbent ports 12 for receiving sulfur sorbent, e.g., limestone, dolomite, hematite, magnetite, etc. The injector 11 preferably is one of four separate coaxial injection nozzles equally spaced around the periphery of the combustor. Coaxial injection promotes intense mixing of the reactants and rapid coal particle heat-up and devolatilization. The inflowing jets coalesce near the combustor center line and form a vertically directed jet, which impinges the stagnation region at the top of the combustor dome. The reaction flow is turned to form a radial wall jet, which in turn, forms a toroidal vortex in the corner of the dome. The toroidal vortex mixes the incoming coal and air flow with hot combustion products, thus providing for favorable ignition characteristics and promoting highly efficient, rapid and stable combustion. Jet impact and radial acceleration of the recirculating vortex flow in the upper dome is the prime mechanism for inertial separation of particles from the combustion gases onto the slagging walls.

A small amount of wall burning of large char particles deposited on the walls with the ash material usually occurs. The combustion products leave the dome as a subsonic plug flow. See Loftus, et al. p. 4–5.

The combustor second stage consists of an impact separator region 20, which is closely integrated to the primary zone 10. The fuel-rich gases exiting the primary combustion zone 10 are accelerated through a nozzle 13 and directed at a collector plate 22, or center body, which is perpendicular to the flow. Particles which are too large to follow the gas stream lines, impinge on the collector plate 22 and are separated from the gas stream. The slag 21 flows down the collector plate 22, while the gas exits above the collector plate 22.

Leaving the impact separator 20, the molten slag 21 is water-quenched by a plurality of nozzles 51 of the quenching zone 50. This cools the slag until it is substantially solid pieces 54. These pieces 54 drop into a water bath 53. A moving chain conveyer 62 in the bottom of the water bath 53 moves the chunks of slag 54 to a series of roller crushers 61 in the slurrying processing region 60. The crushed slag is slurried in water, preferably with impeller 63 and allowed to return to atmospheric pressure by passing out of the apparatus through a pressure let-down valve 64. In a further embodiment of the invention, the slurry exiting the pressure let-down valve 64 is fed into a recycling zone 70. The slurry is preferably pumped employing pump 75 into a settling tank 71. The settling tank 71 separates out the water 72 from the slag particles 73, to enable the removal of slag tailings and the recirculation of water back to the system. The slag tailings can be removed in a road or rail vehicle 74, or equivalent conveyer or transportation means. The recycled water can be pumped via pump 76 and 78 and heat exchanger 77 either back into the slurrying step or back into nozzles 51 for quenching molten slag 21.

At the top of the slag separator, the hot gases having been freed of their loading of slag particles, pass on into the final, or lean combustion zone 30. Here they are mixed with additional compressor discharge air 34, through bellmouth scoops 35, in a can-type combustor, re-ignited, and burned to completion, this time in a lean-burn mode. Discharge air from the combustion turbine compressor exit (not shown) passes into annulus 45, which is circumscribed by the combustion turbine cylinder 42, which carries said air to annular duct, 34. Compressor discharge air is removed through nozzles 31 and conveyed through pipes (not shown) back into the injectors 11 for primary zone operation. The combustion gases 33 exiting the combustion chamber 32 of the final combustion zone 30 then pass to the annular duct 41, circumscribed by the metal cylinder 46, which carries them to the expander inlet. Not shown in FIG. 1, is the second slagging combustor apparatus, which is a mirror image of the first one shown. Combustion gases 44 are received from the second slagging combustor apparatus. Approximately half the compressed air exiting from the combustion turbine compressor, 43, feeds the second slagging combustor (not shown).

Figure 2:
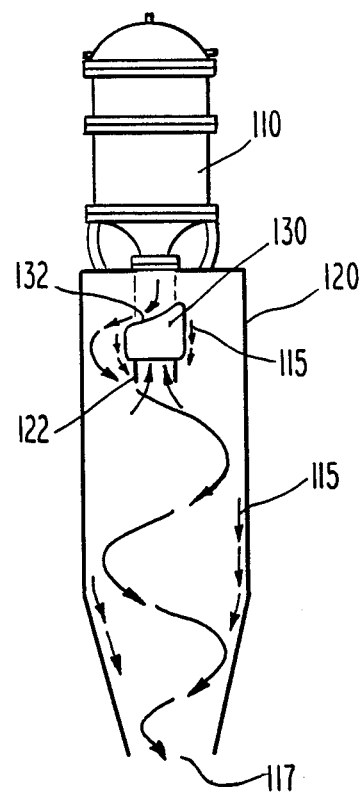
FIG. 2 is a partial front diagrammatic view of a direct coal-fired gas turbine system including cyclone separation means with an integrally disposed impact separator.
Figure 3:
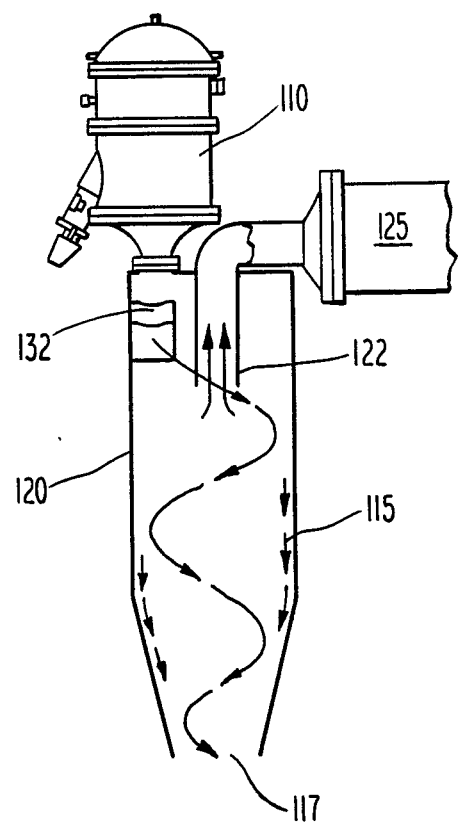
FIG. 3 is a partial side diagrammatic view of the turbine system of FIG. 2.

Referring to FIGS. 2 and 3, there is shown in front and side views, an alternative turbine system comprising cyclone separation means disposed between the primary and secondary combustion compartments. Preferably the system includes cyclone separator 120 with an integral impact separator 130 for separating molten slag from the hot combustion gases of the primary combustion zone 110. Partially burned combustion gases exit primary zone 110 through a nozzle at high velocity. They preferably strike a water-cooled refractory-coated deflector 132. The deflector 132 separates much of the slag, due to the sudden change of the gas stream direction. The slag 115 flows down the deflector 132 to the refractory walls of the cyclone separator 120, and then to a slag disposal system at 117, such as that previously described with respect to FIG. 1.

After leaving the deflector 132, hot gases spiral downward in the cyclone separator, losing additional slag and particulate matter to the slag-coated walls due to centrifugal forces. After losing the particles, the gases return to the top of the cyclone separator and exit through a vortex-finder exit pipe 122. After leaving the cyclone separator 120, the gases turn and pass into the lean combustion zone 125, where additional air is added and combustion is completed. The hot combustion products from the lean zone 125 then pass to an expander section of the gas turbine, as previously described with respect to FIG. 1.

From the foregoing it can be realized that this invention provides an improved direct coal-fired gas turbine system and method for its operation. These methods and systems provide cost efficient and continuous removal of combustion slag products. Although various embodiments have been illustrated, this was for the purpose of describing but not limiting the invention. Various modifications, which will become apparent to one skilled in the art, are within the scope of this invention described in the attached claims.

What is claimed:

1. In a direct coal-fired gas turbine system of the type having a primary combustion zone for burning coal in the presence of compressed air to product hot combustion gases and debris, such as molten slag, and a secondary combustion zone for the lean combustion of said hot combustion gases, said secondary combustion zone coupled to a turbine for generating electric power, the improvement comprising:
cyclone separation means for removing said debris from said hot combustion gases, said cyclone separation means disposed between said primary and secondary combustion zones and in pressurized communication therewith, said cyclone separation means comprising an integrally disposed impact separator disposed on an interior wall of said cyclone separator means for at least separating a portion of said molten slag from said hot combustion gases.

2. The turbine system of claim 1 wherein said impact separator comprises a water cooled refractory surface.

3. The turbine system of claim 1 wherein said impact separator comprises flow deflection means for at least deflecting said molten slag.

4. The turbine system of claim 2 wherein said cyclone separation means comprises a cyclone separator having a centrally located, vortex-finder, exit pipe disposed near a top surface of said cyclone separator.

5. The turbine system of claim 4 wherein said vortex-finder, exit pipe comprises an open end disposed within said cyclone separator and below said impact separator.

6. The turbine system of claim 5 wherein said cyclone separator and said impact separator are disposed within a single pressure vessel.

7. The turbine system of claim 6 wherein said pressure vessel contains a water cooled refractory surface.

8. In a direct coal-fired gas turbine system of the type having a primary combustion zone for burning coal in the presence of compressed air to produce hot combustion gases and debris, such as molten slag, and a secondary combustion zone for the lean combustion zone coupled to a turbine for generating electric power, the improvement comprising:

cyclone separation means for removing said debris from said hot combustion gases, said cyclone separation means disposed between said primary and secondary combustion zones and in pressurized communication therewith, said cyclone separation means comprising an integrally disposed impact separator for at least separating a portion of said molten slag from said hot combustion gases;

said turbine system further comprising quenching means for solidifying said molten slag removed by said impact separator.

9. The turbine system of claim 8 further comprising processing means for forming a slurry from said solidified slag for facilitating removal of said solidified slag from said system.

10. The turbine system of claim 9 wherein said quenching means comprises nozzle means for applying a water spray to said molten slag for aiding in the solidification of said molten slag.

11. The turbine system of claim 10 further comprising a water bath for receiving at least said solidified slag.

12. The turbine system of claim 11 wherein said processing means comprises crusher means for crushing said solidified slag into slag particles.

13. The turbine system of claim 12 wherein said processing means further comprises means for combining said slag particles with water to form a slurry.

14. A direct coal-fired gas turbine system, comprising:

(a) a primary combustion zone for burning coal in the presence of compressed air to produce hot combustion gases and debris, including molten slag;

(b) a secondary combustion zone for the lean combustion of said hot gases;

(c) cyclone separation means comprising: a pressure vessel having an inner wall with a water-cooled refractory lining, said pressure vessel comprising an impact separator disposed on said inner wall, said impact separator comprising a deflector having a water-cooled refractory surface, said deflector disposed for receiving at least said molten slag from said primary combustion zone and directing said molten slag onto said inner wall of said pressure vessel, said pressure vessel further comprising a vortex-finder, exit pipe having an open end disposed in said pressure vessel below said impact separator, said vortex-finder exit pipe disposed for receiving at least a portion of said hot gases.

15. A method of removing debris from hot combustion gases in a direct coal-fired gas turbine system of the type having primary and secondary combustion zones, comprising:

(a) providing cyclone separation means for removing a portion of said debris from said hot combustion gases, said cyclone separation means disposed between said primary and secondary combustion zones and in pressurized communication therewith;

(b) burning coal in the presence of compressed air in said primary combustion zone to produce debris, such as molten slag, and hot gases;

(c) contacting a portion of said debris and said hot combustion gases with said impact separator to separate a portion of said hot combustion gases from said debris;

(d) centrifugally directing at least said hot combustion gases along an inner wall of said cyclone separation means to further separate said debris from said hot combustion gases to produce clean hot gases;

(e) disposing said clean hot gases into said secondary combustion zone;

(f) lean combusting said clean hot gases with additional air;

(g) quenching said molten slag with water; and (h) slurrying said solidified slag for facilitated removal of said solidified slag from said turbine system.

16. The method of claim 15 wherein said impact separator comprises a deflector.

17. The method of claim 16 wherein said contacting step comprises deflecting said hot gases and said debris to effect at least a partial separation of said hot gases from said debris.

* * * * *